United States Patent [19]

Cochoy et al.

[11] 4,140,727

[45] Feb. 20, 1979

[54] FLUOROALKYLENEETHER SILICATE COPOLYMERS

[75] Inventors: Robert E. Cochoy, Colorado Springs, Colo.; Alan A. Shaffer, New Carlisle, Ohio

[73] Assignee: The United States of America as represented by the Secretary of the Air Force, Washington, D.C.

[21] Appl. No.: 868,355

[22] Filed: Jan. 10, 1978

[51] Int. Cl.$^2$ .............................................. C08L 43/04
[52] U.S. Cl. .............................. 260/827; 260/37 SB; 528/12; 528/29; 528/32; 528/38
[58] Field of Search .......... 260/2 S, 46.5 R, 46.5 UA, 260/827; 528/12, 29, 32, 38

[56] References Cited

U.S. PATENT DOCUMENTS

| | | | |
|---|---|---|---|
| 3,346,515 | 10/1967 | Curry | 260/2 S |
| 3,997,501 | 12/1976 | McLeod | 260/2 S |

*Primary Examiner*—Melvyn I. Marquis
*Attorney, Agent, or Firm*—Joseph E. Rusz; Cedric H. Kuhn

[57] ABSTRACT

Fluoroalkyleneether silicate copolymers are synthesized by the polycondensation of a bis-dimethylcarbinol containing a fluoroalkyleneether segment and bis-(dimethylamino) methylvinylsilane. The copolymers are useful in applications, e.g., as seals and sealants, involving use temperatures ranging from about -90° C. to 600° C. They are particularly useful when blended with a fluorocarbon elastomer, enhancing the strength and low temperature flexibility of the elastomer.

14 Claims, No Drawings

FLUOROALKYLENEETHER SILICATE COPOLYMERS

RIGHTS OF THE GOVERNMENT

The invention described herein may be manufactured and used by or for the Government of the United States for all governmental purposes without the payment of any royalty.

FIELD OF THE INVENTION

This invention relates to fluoroalkyleneether silicate copolymers. In one aspect it relates to a process for preparing the copolymers. In another aspect it relates to a composition comprising the copolymer and a fluorocarbon elastomer.

BACKGROUND OF THE INVENTION

There has existed for some time a need for thermally stable, elastomeric polymers for various aerospace and sealant applications. Also, for a polymer to satisfy the requirements, it must be hydrolytically stable and must retain its elastomeric properties at sub-zero temperatures. While silicone polymers have been suggested for such uses, they are not entirely satisfactory because of their hydrolytic instability. In U.S. Pat. No. 4,005,142, R. C. Evers recently disclosed perfluoroalkylene ether bibenzoxazole polymers possessing thermooxidative stability and having a low glass transition temperature (Tg). These properties render the bibenzoxazole polymers suitable for seal and sealant applications. Since the Tg of a polymer is an indication of the temperature at which it retains its elastomeric properties, it would be desirable to have polymers with even lower glass transition temperatures.

For a number of years it has been recognized that fluorocarbon elastomers, particularly copolymers of vinylidene fluoride and hexafluoropropylene, possess good mechanical properties, such as tensile strength and tear resistance, and high temperature stability. These properties make them especially attractive for use as O-ring seals in hydraulic systems. However, the poor low temperature flexibility of the elastomers limits their use in this application. Attempts to improve the low temperature flexibility of the elastomers to below −40° F. have proven to be unsuccessful. For example, blending of the elastomers with commercially available low temperature flexible polymers have generally given blends possessing the worst properties of both components. To meet the advanced aerospace requirements of the future, there is a need for hydraulic O-ring seals that can meet the low temperature sealing requirement of −65° F. while maintaining a satisfactory performance throughout the entire application profile.

It is an object of this invention to provide a fluoroalkyleneether silicate copolymer which possesses a high degree of thermal and hydrolytic stability and has a very low glass transition temperature.

Another object of the invention is to provide a blend of the copolymer and a fluorocarbon elastomer that has an increased strength and low temperature flexibility as compared to the fluorocarbon elastomer per se.

A further object of the invention is to provide a process for preparing the copolymer.

Other objects and advantages of the invention will become apparent to those skilled in the art upon consideration of the accompanying disclosure.

SUMMARY OF THE INVENTION

The present invention resides in a fluoroalkyleneether silicate copolymer consisting essentially of recurring units having the following structural formula:

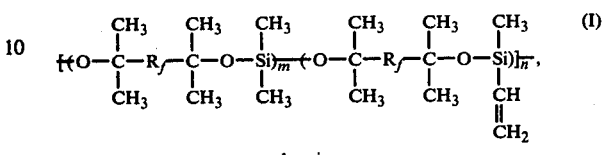

wherein $R_f$ is $(CF_2OCH_2)_x$, in which x is an integer in the range of 4 to 8, inclusive, or $CF_2(OCF_2CF_2)_yO(CF_2)_5O(CF_2CF_2O)_zCF_2$ in which y and z are each an integer equal to at least 1 and the sum of y and z is in the range of 5 to 7, inclusive, m is equal to zero or 2, and n is an integer equal to the number of recurring units. In general, n is an integer equal to at least 2, e.g., an integer in the range of about 5 to 15. Alternatively, n can be defined as an integer having a value sufficient to provide a copolymer having an inherent viscosity from about 0.5 to 0.25 dl/g when measured in hexafluoroisopropanol (HFIP) at 25° C.

In a preferred embodiment, the present invention resides in an elastomeric composition comprising a blend of a fluorocarbon elastomer and the fluoroalkyleneether silicate copolymer. The blend generally contains about 70 to 95 parts by weight of fluorocarbon elastomer and about 5 to 30 parts by weight of copolymer, based on a total of 100 parts by weight. It is often preferred to utilize as the fluorocarbon elastomer one derived from vinylidene fluoride and hexafluoropropylene, a well known, commercially available elastomer. It was discovered that the copolymer functions as a co-reactive plasticizer in the blend, enhancing the strength and low temperature flexibility of the fluorocarbon elastomer. Thus, it has been possible to overcome the problem of poor low temperature flexibility that has in the past been associated with the elastomer.

In another embodiment the present invention lies in a process for preparing fluoroalkyleneether silicate copolymers. Broadly speaking, the process comprises the step of reacting in an inert atmosphere a bis-dimethylcarbinol containing a fluoroalkyleneether segment with bis-(dimethylamino) methylvinylsilane alone or in admixture with bis-(dimethylamino)dimethylsilane. Examples of gases that can be used to provide an inert atmosphere include nitrogen, helium or argon.

The polycondensation reaction involved in preparing the polymers of this invention is shown by the following equation:

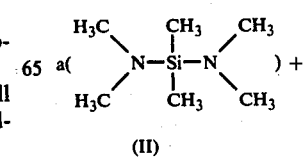

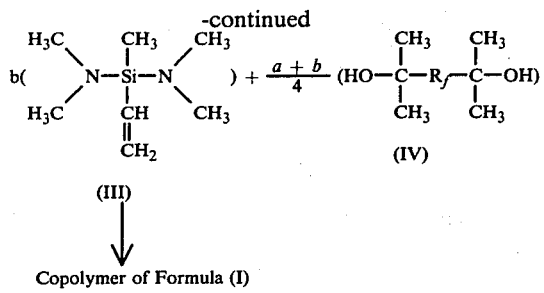

(III)

↓

Copolymer of Formula (I)

As seen from the foregoing equation, a and b represent the number of moles of the reactants employed in the condensation reaction. When a is equal to zero, m in formula (I) is likewise equal to zero. When the bis-(dimethylamino)dimethylsilane (II) is employed, the mole ratio of this compound to the bis-(dimethylamino)-methylvinylsilane (III) is 2 to 1, i.e., a:b=2:1. It is also seen from the formula that the total mole ratio of compound II (when used) and compound III to bis-dimethylcarbinol (IV) is 4 to 1.

The condensation reaction is conducted in a hydrocarbon solvent, preferably an aromatic hydrocarbon such as benzene, toluene or a xylene. It is usually preferred to carry out the reaction under reflux conditions for a period ranging from about 12 to 36 hours. During the reaction dimethylamine is evolved and termination of amine evolution is an indication that the reaction is completed.

The bis-dimethylcarbinols used in the preparation of the copolymers of this invention are new compounds which are synthesized by reacting an ether diacid fluoride with a Grignard reagent ($CH_3MgI$).
The reaction involved can be represented by the following equation:

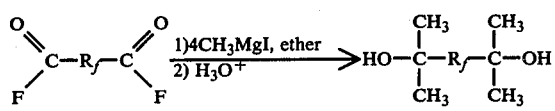

In this equation, $R_f$ is as indicated hereinabove. Ether diacid fluorides (EDAF's) that can be used in the synthesis are disclosed in U.S. Pat. No. 3,960,814, issued to one of us on June 1, 1976. The details of the synthesis of a representative bis-dimethylcarbinol are set forth in Example I.

The procedures followed for preparing bis-(dimethylamino)methylvinylsilane and bis-(dimethylamino)-dimethylsilane are described in Example II and III, respectively.

A more complete understanding of the invention can be obtained by referring to the following illustrative examples which are not intended, however, to be unduly limitative of the invention.

EXAMPLE I

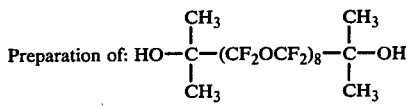

To a 300 ml three-necked, round-bottom flask equipped with a mechanical stirrer, addition funnel (60 ml), and reflux condenser topped with a nitrogen inlet (all glassware dried in oven overnight) was added 1.65 g (70 g-atoms) of Mg turnings. Anhydrous ethyl ether (40 ml) was added to the flask, and, under a dry nitrogen blanket, 9.0 g (63 mmoles) of iodomethane dissolved in 40 ml ether was added dropwise at a rate sufficient to maintain a mild reflux. After addition of the iodomethane and Grignard formation exotherm, the solution was stirred and heated at mild reflux for 30 minutes. Then 20 ml of dry F-2-butylfuran was added all at once to the Grignard solution. A solution of

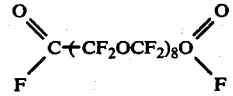

(EDAF) (10.2 g, 10 mmoles) in 40 ml of F-2-butylfuran was then added dropwise at ambient temperature to the vigorously stirred solution at a rate sufficient to maintain a mild reflux. A fairly rapid addition rate (about 5 drops per sec.) was satisfactory. After addition of the EDAF solution, the reaction mixture was heated to reflux for 1 hour. A dry nitrogen atmosphere was maintained throughout the above procedure.

The white/gray suspension was allowed to stir under $N_2$ atmosphere at ambient temperature overnight. The next morning, the excess Grignard was quenched by dropwise addition of ethanol (15 ml) and $H_2O$ (approx 10 ml), until the salts took on a granular appearance, followed by HCl (approx 30 ml, 10%) until two or three clear phases were observed with all salts dissolved. The 1,1,2-trichloro-1,2,2-trifluoroethane (Freon 113) soluble layers were combined and saved. The aqueous (Freon 113 insoluble) layer was extracted twice with 15 ml Freon 113 and these washings were combined with the previously saved organic layers. The combined organic layers were successively washed with $H_2O$ (2 × 50 ml), saturated $NaHCO_3$ (1 × 50 ml), and $H_2O$ (1 × 50 ml) and dried over $MgSO_4$.

After filtering and evaporation, the residue was fractionally distilled in vacuo through a 6 inch Vigreaux column to give the final product as a clear, water white viscous liquid. The diol with the above structure of

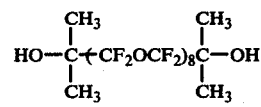

had a bp range of 115°–117° C. at 0.035 mm Hg pressure. Yields ranged from 65 to 80%.

Analysis: Calc'd: C,25.26; H,1.35; Found: C,25.32, 25.43; H,1.43, 1.38.

The product was identified by infrared analysis as having the aforementioned structure.

EXAMPLE II

Preparation of: 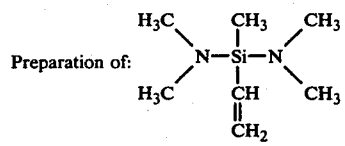

To a 300 ml three-necked round-bottomed flask equipped with a low temperature thermometer, a 2 inch magnetic stir bar and nitrogen gas inlet was added methylvinyldichlorosilane (15 g 0.105 moles) along with 200 ml of dry petroleum ether (bp range, 30°-50° C.). After purging the system with nitrogen gas, the solution was cooled to −65° C. with an n-butanol/dry ice bath. Then, under direct nitrogen flow, dimethylamine (25.0 g, 0.5 moles) was added directly to the stirred solution. The reaction exotherm sent the temperature up to approximately 0° C. The reaction mixture was cooled back down to −55° C., then allowed to warm gradually to room temperature.

After filtering the amine salts and removal of the solvent by simple distillation under nitrogen, the residue was distilled through a 6 inch Vigreaux column under nitrogen atmosphere. The product was obtained at 143°-145° C. as a clear colorless liquid. Yield obtained was about 75%. The product was identified by infrared analysis as having the aforementioned structure.

EXAMPLE III

Preparation of: 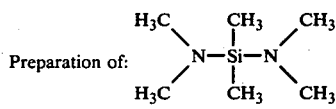

To a 300 ml three-necked, round bottomed flask equipped with a low temperature thermometer, a 2 inch magnetic stir bar and nitrogen gas inlet was added freshly distilled dimethyldichlorosilane bp 68.5°-69.5° C. (15.0 g, 0.116 moles) along with 200 ml of dry petroleum ether (bp range 30°-50° C.). After purging with nitrogen gas, the solution was cooled to −50° C. with an n-butanol/dry ice bath. Then under direct nitrogen flow, dimethylamine (25.0 g, 0.5 mole (33 ml) was added directly to the stirred solution. The reaction exotherm sent the temperature up to ∼−15° C. The reaction mixture was cooled back down to −50° C. and then allowed to warm gradually to room temperature.

After filtering the amine salts and removal of the solvent by simple distillation under nitrogen, the residue was distilled through a 6 inch Vigreaux column under nitrogen atmosphere. The product was obtained at a bp of 125°-128° C. as a clear colorless liquid. Yield was 8.4 g (50%).

The structure of the product as set forth above was confirmed by infrared analysis.

EXAMPLE IV

A run was conducted in which a copolymer of this invention was prepared by the polycondensation of the bis-(dimethylcarbinol), prepared as described in Example I, and bis-(dimethylamino)methylvinylsilane, prepared as described in Example II. The reaction involved can be represented by the following equation:

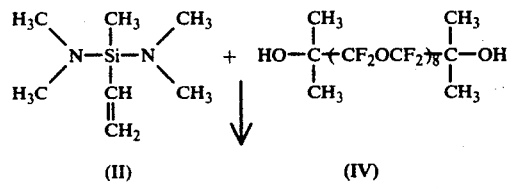

(II)                (IV)

-continued $$+O-\underset{\underset{CH_3}{|}}{\overset{\overset{CH_3}{|}}{C}}+CF_2OCF_2+\underset{\underset{CH_3}{|}}{\overset{\overset{CH_3}{|}}{C}}-O-\underset{\underset{\underset{CH_2}{\overset{\|}{CH}}}{|}}{\overset{\overset{CH_3}{|}}{Si}}+_n$$

(I)

In carrying out the run, compound (IV) (6.7 mmoles, 7.0 g) was added to a 50 ml three-necked, round-bottom flask. The flask was equipped with a 1 inch stir bar, glass extension capped with a rubber septum, a gas inlet adapter, and a reflux condenser topped with a gas outlet leading to a FC-43 bubbler. Dry xylene (30 ml) was added to the flask, and the mixture was heated (95° C.) under direct nitrogen flow until a solution was obtained. At this point, compound (II) (27 mmoles, 4.2 g) was added via syringe through the rubber septum.. Litmus paper testing of the nitrogen flow over the reaction indicated strong dimethylamine evolution. The reaction was then heated at xylene reflux (130° C.) under direct nitrogen flow for 23 hours. At this time, litmus paper testing indicated negligible dimethylamine evolution, and a solid mass of polymeric material had precipitated out of solution. The reaction mixture was decanted and repeated efforts to dissolve the polymer in Freon solvents failed, indicating a gelled product. The crude polymer was air dried, followed by drying overnight under vacuum (0.1 mm Hg) at 80° C. The dried polymer (6.9 g, 92% yield) had a slight yellow-brown color and was a cohesive taffy like solid.

Analysis: Calc'd: C,26.93; H,1.62; Found: C27.12; H,1.64.

Infrared analysis of the product confirmed the polymer structure set forth above.

The polymer was tested for low temperature flexibility, thermal stability, peroxide curability, and hydrolytic stability. Its glass transition temperature (Tg) was −89° C. Thermogravimetric analysis in air showed a 10 percent weight loss at 290° C. (572° F.). The polymer gum was optimally cured with 8 parts by weight of 2,4-dichloro benzoyl peroxide and 10 parts by weight of magnesium oxide (based on 100 parts by weight of polymer), giving an elastomeric and uniform vulcanizate as evidenced in scanning electron microscope pictures. The cured polymer, when exposed for 2 weeks to 95 percent humidity at 200° F., was visibly unaffected.

EXAMPLE V

A run was carried out in which the copolymer product synthesized as described in Example IV was blended with a fluorocarbon elastomer for the purpose of improving the low temperature flexibility and strength of the elastomer. A control run was also carried out in which the fluorocarbon elastomer was not blended with the copolymer. The formulation recipes and the curing cycles are shown below in Table I.

TABLE I

| | Parts by weight | Parts by weight |
|---|---|---|
| Viton GLT[1] | 100 | 80 |
| Copolymer[2] | | 20 |
| Carbon black | 30 | 30 |
| Triallyl isocyanurate | 4 | 4 |
| Calcium hydroxide | 4 | 4 |
| Luperco 101XL[3] | 4 | 4 |
| Press cure | 10 min. at 350° F | 10 min. at 350° F |
| Post cure | 4 hrs from ambient to 500° F; 24 hrs | 4 hrs from ambient to 500° F; 24 hrs |

TABLE I-continued

|  | Parts by weight at 450° F | Parts by weight at 450° F |
|---|---|---|

[1] Peroxide curable fluorocarbon polymer commercially available from E. I. Dupont de Nemours and Company, Wilmington, Del.
[2] Product prepared as described in Example IV
[3] 2,5-dimethyl-2,5-bis(t-butylperoxy)hexane Physical properties of the two vulcanizates were determined and the results obtained are set forth below in Table II.

TABLE II

|  | Viton GLT | Viton GLT-Copolymer Blend |
|---|---|---|
| Tensile strength, psi[1] | 2255 | 2180 |
| Elongation, %[2] | 155 | 130 |
| Hardness, pts., Shore A[3] | 78 | 84 |
| 100% Modulus[4] | 1270 | 2030 |
| Compression set, %[5] (25% deflection, standard 214 size O-rings, 70 hrs at 342° F) | 15 | 15.4 |
| TR-10, ° F[6] | −19 | −27 |
| 20 | — | −24 |
| 30 | — | −22 |
| 40 | — | −20 |
| 50 | — | −18.5 |

[1] Determined according to method of ASTM D412-51T (para. D)
[2] Determined according to method of ASTM D412-51T (para. E)
[3] Determined according to method of ASTM D314-58
[4] Determined according to method of ASTM D412-51T (para. F)
[5] Determined according to method of ASTM D395-55 (Method B)
[6] Determined according to method of ASTM D13259-58T As seen from the data in Table II, the blend displayed significantly improved low temperature characteristics (TR-10 values) and 100% modulus values as compared to these properties of the fluorocarbon elastomer per se. Scanning electron microscope examination of the blend indicated that covulcanization occurred.

EXAMPLE VI

A run was conducted in which a copolymer of this invention was prepared by the polycondensation of the bis-(dimethylcarbinol), prepared as described in Example I, bis-(dimethylamino)methylvinylsilane, prepared as described in Example II, and bis-(dimethylamino)-dimethylsilane, prepared as described in Example III. The reaction involved can be represented by the following equation:

the flask after which dry xylene (10 ml) was introduced under direct nitrogen flow. The resulting mixture was then heated (95° C. pot temperature) until a solution was obtained. Compound (II) (2.0 g, 13.5 mmoles) was added via syringe through the rubber septum followed immediately by addition in the same manner of compound (III) (1.0 g, 6.5 mmoles). The pot temperature was raised to 115° C. and maintained at that temperature for the duration of the reaction (26 hours). Upon cooling the reaction mixture, the polymer precipitated out of solution. The precipitated polymer was recovered by decanting off the xylene solvent after which it was dried overnight at 80°-85° C. at 1-2 mm Hg.

The off-white creamy ungelled polymer product (>95% yield) had a glass transition temperature (Tg) of −89° C. Infrared analysis confirmed the polymer structure set forth above. The polymer had an inherent viscosity in hexafluoroisopropanol (HFIP) of 0.092 dl/g at 25° C.

The polymer was cured with 4 parts of Luperco 101 XL, giving an elastic vulcanizate. Although not as strong as the cured polymer of Example IV, its elasticity properties were superior to that polymer which had a tendency to be brittle as a result of overcuring. Any problem of overcuring was obviated in the case of the polymer of this example by controlling the number of vinyl groups in the polymer chains. This control is accomplished by using a 2:1 mole ratio of compound (II) to compound (III). Polymer products obtained in the process utilizing both compounds (II) and (III) are, therefore, the preferred polymers of this invention.

EXAMPLE VII

A run was conducted in which the copolymer product of Example VI was blended with a fluorocarbon elastomer. The elastomer used, the formulation recipe, and the conditions of cure were the same as those described in Example V.

Physical properties of the vulcanizate prepared were determined and the results obtained are shown below in Table III.

TABLE III

| Tensile strength, psi | 1385 |
|---|---|
| Elongation, % | 170 |
| Hardness, pts, Shore A | 79 |
| 100% Modulus, psi | 975 |
| Compression set, % (25% deflection -214 size O-rings, 70 hrs at 400° F) | 20.5 |
| TR-10, ° F | −25 |

$$\begin{array}{c}H_3C\\ \\H_3C\end{array}\!\!\!>\!\!N\!-\!\underset{\underset{CH_3}{|}}{\overset{\overset{CH_3}{|}}{Si}}\!-\!N\!<\!\!\!\begin{array}{c}CH_3\\ \\CH_3\end{array} + \begin{array}{c}H_3C\\ \\H_3C\end{array}\!\!\!>\!\!N\!-\!\underset{\underset{CH_2}{\overset{\|}{CH}}}{\overset{\overset{CH_3}{|}}{Si}}\!-\!N\!<\!\!\!\begin{array}{c}CH_3\\ \\CH_3\end{array} + HO\!-\!\underset{\underset{CH_3}{|}}{\overset{\overset{CH_3}{|}}{C}}\!+\!CF_2OCF_2\!\!+_{\overline{6}}\underset{\underset{CH_3}{|}}{\overset{\overset{CH_3}{|}}{C}}\!-\!OH \longrightarrow$$

(II)         (III)         (IV)

$$+\!\!+\!\!O\!-\!\underset{\underset{CH_3}{|}}{\overset{\overset{CH_3}{|}}{C}}\!+\!CF_2OCF_2\!+_{\overline{6}}\underset{\underset{CH_3}{|}}{\overset{\overset{CH_3}{|}}{C}}\!-\!O\!-\!\underset{\underset{CH_3}{|}}{\overset{\overset{CH_3}{|}}{Si}}\!\!+_{\overline{2}}\!\!+\!O\!-\!\underset{\underset{CH_3}{|}}{\overset{\overset{CH_3}{|}}{C}}(CF_2OCF_2)_{\overline{6}}\underset{\underset{CH_3}{|}}{\overset{\overset{CH_3}{|}}{C}}\!-\!O\!-\!\underset{\underset{\underset{CH_2}{\overset{\|}{CH}}}{|}}{\overset{\overset{CH_3}{|}}{Si}}\!\!+_n$$

(I)

In conducting the run, the same equipment as described in Example IV was employed. The bis-dimethylcarbinol (IV) (3.95 g, 4.85 mmoles) was added to The data in the foregoing table indicate a significantly improved elongation over that of the vulcanizates of Example V. Although tensile strength and 100% modulus are reduced, they are still within satisfactory limits for hydraulic system seal application. The foregoing data indicate that other physical properties have also been satisfactorily maintained.

From the foregoing, it is seen that the polymers of this invention have very good low temperature flexibility. Because of the presence of pendent vinyl groups, the polymers can be readily cured with peroxides. In the cured state, the polymers are hydrolytically stable because of steric protection of the silicate bonds with hydrocarbon groups. Blending of the polymers with a fluorocarbon elastomer enhances the low temperature flexibility and strength of the elastomer without an adverse effect on other desirable properties.

As will be evident to those skilled in the art, modification of the present invention can be made in view of the foregoing disclosure without departing from the spirit and scope of the invention.

We claim:

1. A fluoroalkyleneether silicate copolymer consisting essentially of recurring units having the following structural formula:

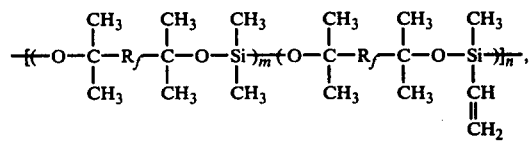

wherein $R_f$ is $(CF_2OCF_2)_x$, in which x is an integer in the range of 4 to 8, inclusive, or $CF_2(OCF_2CF_2)_yO(CF_2)_5O(CF_2CF_2O)_zCF_2$, in which y and z are each an integer equal to at least 1 and the sum of y and z is in the range of 5 to 7, inclusive, m is equal to zero or 2, and n is an integer equal to the number of recurring units.

2. The copolymer of claim 1 in which $R_f$ is $(CF_2OCF_2)_x$ and m is equal to zero.

3. The copolymer of claim 1 in which $R_f$ is $(CF_2OCF_2)_x$ and m is equal to 2.

4. The copolymer of claim 1 in which $R_f$ is $CF_2(OCF_2CF_2)_yO(CF_2)_5O(CF_2CF_2O)_zCF_2$ and m is equal to zero.

5. The copolymer of claim 1 in which $R_f$ is $CF_2(OCF_2CF_2)_yO(CF_2)_5O(CF_2CF_2O)_zCF_2$ and m is equal to 2.

6. An elastomeric composition comprising a blend of a fluorocarbon elastomer and a fluoroalkyleneether silicate copolymer consisting essentially of recurring units having the following structural formula:

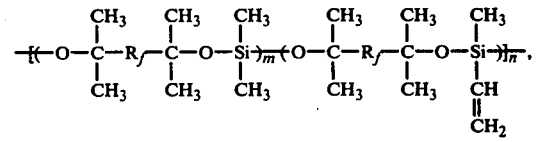

wherein $R_f$ is $(CF_2OCF_2)_x$, in which x is an integer in the range of 4 to 8, inclusive, or $CF_2(OCF_2CF_2)_yO(CF_2)_5O(CF_2CF_2O)_zCF_2$, in which y and z are each an integer equal to at least 1, and the sum of y and z is in the range of 5 to 7, inclusive, m is equal to zero or 2, and n is an integer equal to the number of recurring units, said blend containing about 70 to 95 parts by weight of fluorocarbon elastomer and about 5 to 30 parts by weight of copolymer, based on a total of 100 parts by weight.

7. An elastomeric composition comprising a blend of a fluorocarbon elastomer derived from vinylidene fluoride and hexafluoropropylene and a fluoroalkyleneether silicate copolymer consisting essentially of recurring units having the following structural formula:

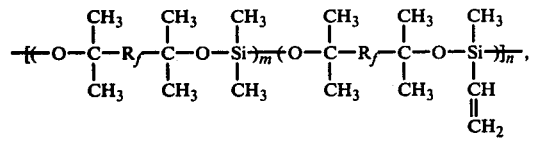

wherein $R_f$ is $(CF_2OCF_2)_x$, in which x is an integer in the range of 4 to 8, inclusive, or $CF_2(OCF_2CF_2)_yO(CF_2)_5O(CF_2CF_2O)_zCF_2$, in which y and z are each an integer equal to at least 1, and the sum of y and z is in the range of 5 to 7, inclusive, m is equal to zero or 2, and n is an integer equal to the number of recurring units, said blend containing about 70 to 95 parts by weight of fluorocarbon elastomer and about 5 to 30 parts by weight of copolymer, based on a total of 100 parts by weight.

8. The composition of claim 6 in which $R_f$ is $(CF_2OCF_2)_x$ and m is equal to zero.

9. The composition of claim 6 in which $R_f$ is $(CF_2OCF_2)_x$ and m is equal to 2.

10. The composition of claim 6 in which $R_f$ is $CF_2(OCF_2CF_2)_yO(CF_2)_5O(CF_2CF_2O)_zCF_2$ and m is equal to zero.

11. The composition of claim 6 in which $R_f$ is $CF_2(OCF_2CF_2)_yO(CF_2)_5O(CF_2CF_2O)_zCF_2$ and m is equal to 2.

12. A process for preparing a fluoroalkyleneether silicate copolymer which comprises the step of reacting in an inert atmosphere a bis-dimethyl carbinol having the following formula:

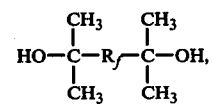

wherein $R_f$ is $(CF_2OCF_2)_x$, in which x is an integer in the range of 4 to 8, inclusive, or $CF_2(OCF_2CF)_yO(CF_2)_5O(CF_2CF_2O)_zCF_2$, in which y and z are each an integer equal to at least 1 and the sum of y and z is in the range of 5 to 7, inclusive, with a methyl vinyl silane having the following formula:

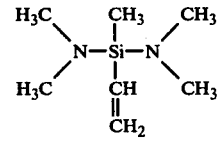

alone or in admixture with a dimethylsilane having the following formula:

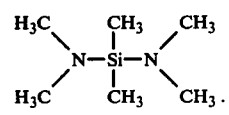

13. The process of claim 12 in which the bis-dimethyl carbinol is reacted with the methyl vinyl silane alone and the mole ratio of silane to carbinol is about 4 to 1.

14. The process of claim 12 in which the bis-dimethyl carbinol is reacted with the methyl vinyl silane in admixture with the dimethylsilane, the mole ratio of silanes to carbinol is about 4 to 1, and the mole ratio of dimethylsilane to methyl vinyl silane is about 2 to 1.

* * * * *